US012196095B2

(12) United States Patent
Roach et al.

(10) Patent No.: US 12,196,095 B2
(45) Date of Patent: Jan. 14, 2025

(54) GAS TURBINE ENGINE COMPONENT HAVING AN AIRFOIL WITH INTERNAL CROSS-RIBS

(71) Applicant: Raytheon Technologies Corporation, Farmington, CT (US)

(72) Inventors: James T. Roach, Vernon, CT (US); Jonas Banhos, West Hartford, CT (US); Russell Kim, Temecula, CA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/071,121

(22) Filed: Nov. 29, 2022

(65) Prior Publication Data

US 2024/0175373 A1 May 30, 2024

(51) Int. Cl.

*F01D 25/12* (2006.01)
*F01D 5/18* (2006.01)
*F01D 9/02* (2006.01)

(52) U.S. Cl.

CPC ............... *F01D 25/12* (2013.01); *F01D 5/18* (2013.01); *F01D 5/187* (2013.01); *F01D 9/02* (2013.01); *F05D 2220/323* (2013.01); *F05D 2240/126* (2013.01); *F05D 2240/30* (2013.01); *F05D 2260/20* (2013.01)

(58) Field of Classification Search

CPC . F01D 25/12; F01D 5/18; F01D 5/187; F01D 9/02; F05D 2220/323; F05D 2240/126; F05D 2240/30; F05D 2260/20

See application file for complete search history.

(56) References Cited

U.S. PATENT DOCUMENTS 3,394,918 A * 7/1968 Wiseman .............. B32B 15/013 416/241 R
5,246,340 A * 9/1993 Winstanley ............. F01D 5/187 415/115
6,126,396 A * 10/2000 Doughty ................ F01D 5/187 416/97 R
6,206,638 B1 * 3/2001 Glynn ..................... F01D 5/187 415/115

(Continued)

FOREIGN PATENT DOCUMENTS

WO WO-2016122483 A1 * 8/2016
WO 2020/209847 A1 10/2020

OTHER PUBLICATIONS

European Search Report for EP Application No. 23212320.8 dated Apr. 5, 2024.

*Primary Examiner* — Brian Christopher Delrue

(74) *Attorney, Agent, or Firm* — Carlson, Gaskey & Olds, P.C.

(57) ABSTRACT

A gas turbine engine component includes an airfoil body extending between a leading edge and a trailing edge and having a suction wall and a pressure wall. An outer surface of the airfoil body is formed by an outer coat defining around the pressure and suction sides, a leading edge and a trailing edge. An internal cross-rib is formed within a cavity in the airfoil body. The internal cross-rib extends to be secured to the outer coat adjacent the leading edge and the trailing edge, and extending across the internal cavity to form a junction such that the cross-rib is x-shaped. The outer coat and the cross-rib are formed of ceramic matrix composites. A gas turbine engine is also disclosed.

20 Claims, 5 Drawing Sheets

(56) References Cited

U.S. PATENT DOCUMENTS

| | | | | | |
|---|---|---|---|---|---|
| 6,283,708 | B1 * | 9/2001 | Zelesky | F01D 5/189 |
| | | | | 416/97 R |
| 7,097,426 | B2 * | 8/2006 | Lee | F01D 5/187 |
| | | | | 416/97 R |
| 7,217,092 | B2 * | 5/2007 | Lee | F01D 5/187 |
| | | | | 416/97 R |
| 7,600,978 | B2 * | 10/2009 | Vance | F01D 5/147 |
| | | | | 416/241 B |
| 8,038,408 | B2 | 10/2011 | McMillan | |
| 8,057,183 | B1 * | 11/2011 | Liang | F01D 5/187 |
| | | | | 416/96 A |
| 8,070,442 | B1 * | 12/2011 | Liang | F01D 5/187 |
| | | | | 416/97 R |
| 8,500,392 | B2 * | 8/2013 | Durocher | F01D 9/06 |
| | | | | 415/142 |
| 9,995,149 | B2 * | 6/2018 | Foster | F01D 5/187 |
| 10,378,364 | B2 * | 8/2019 | Spangler | F02C 7/18 |
| 11,111,857 | B2 * | 9/2021 | Spangler | B22C 9/103 |
| 11,149,566 | B2 * | 10/2021 | Bordoni | F01D 9/041 |
| 11,506,065 | B1 * | 11/2022 | Kim | C04B 35/80 |
| 2008/0124512 | A1 * | 5/2008 | Steibel | F01D 5/284 |
| | | | | 428/105 |
| 2013/0142660 | A1 | 6/2013 | McCaffrey | |
| 2014/0165570 | A1 * | 6/2014 | Herring | F02C 7/14 |
| | | | | 60/730 |
| 2016/0215634 | A1 | 7/2016 | Walston | |
| 2016/0258320 | A1 * | 9/2016 | Thomas | F01D 25/005 |
| 2017/0159489 | A1 * | 6/2017 | Sennoun | F28D 7/1676 |
| 2017/0284417 | A1 * | 10/2017 | Zaccardi | F01D 9/065 |
| 2019/0145269 | A1 | 5/2019 | Campbell | |
| 2020/0256194 | A1 * | 8/2020 | Spangler | F01D 5/141 |
| 2020/0277858 | A1 * | 9/2020 | Spangler | F01D 5/181 |
| 2020/0347734 | A1 * | 11/2020 | Spangler | F01D 5/187 |

* cited by examiner

GAS TURBINE ENGINE COMPONENT HAVING AN AIRFOIL WITH INTERNAL CROSS-RIBS

BACKGROUND OF THE INVENTION

This application relates to a gas turbine engine components having an airfoil wherein generally x-shaped cross-ribs are placed in an internal cavity.

Gas turbine engines are known, and typically include a fan delivering air into a bypass duct as propulsion air. The fan also delivers air into a compressor where it is compressed and then delivered into a combustor. Compressed air is mixed with fuel and ignited in the combustor, and products of this combustion pass downstream over turbine rotors, driving them to rotate. The turbine rotors rotate fan and compressor rotors.

It is known that the turbine section will see very high temperatures from the products of combustion. As such, various of ways of providing gas turbine engine turbine section components that can withstand high temperatures are utilized. One gas turbine engine component is a static vane. The static vanes have airfoils positioned in circumferentially spaced rows axially interspersed with rotating turbine blades. The static vanes serve to direct the products of combustion downstream in a desired direction when they impact the turbine blades to increase the efficiency.

Gas turbine engine components such as static vanes or turbine blades have an airfoil that will see very high temperatures. As such, it has been proposed to use ceramic matrix composites ("CMCs") to form the components.

While CMC components show promise for use in a turbine section, they also are subject to challenging stresses.

SUMMARY OF THE INVENTION

In a featured embodiment, a gas turbine engine component includes an airfoil body extending between a leading edge and a trailing edge and having a suction wall and a pressure wall. An outer surface of the airfoil body is formed by an outer coat defining around the pressure and suction sides, a leading edge and a trailing edge. An internal cross-rib is formed within a cavity in the airfoil body. The internal cross-rib extends to be secured to the outer coat adjacent the leading edge and the trailing edge, and extending across the internal cavity to form a junction such that the cross-rib is x-shaped. The outer coat and the cross-rib are formed of ceramic matrix composites.

In another embodiment according to the previous embodiment, the component is a static vane for use in a turbine section of a gas turbine engine.

In another embodiment according to any of the previous embodiments, major chambers are defined between the junction and the leading edge and the trailing edge. Minor chambers are formed in the cavity between the junction and an inner surface of the pressure side and inner surface of the suction side. There is a cooling air supply supplying cooling air into the major chambers and the minor chambers.

In another embodiment according to any of the previous embodiments, a pressure of the cooling air supplied into the major air chambers is equal to a pressure of the cooling air supplied into the minor chambers.

In another embodiment according to any of the previous embodiments, a pressure of the cooling air supplied into the minor chambers is less than a pressure of the cooling air supplied into the major chambers.

In another embodiment according to any of the previous embodiments, the pressure of the cooling air supplied into the minor chambers is between 10% and 90% of the pressure of the cooling air supplied into the major chambers.

In another embodiment according to any of the previous embodiments, there are at least two of the cross-ribs in the cavity.

In another embodiment according to any of the previous embodiments, the major chambers are defined between the junction on one of the cross-ribs and the leading edge, between the junction on the one of the cross-ribs and the junction on the other of the cross-ribs, and the junction on the other of the cross-ribs and the trailing edge. The minor chambers are formed in the cavity between each the junction and an inner surface of the pressure side and inner surface of the suction side. There is a cooling air supply supplying cooling air into the major chambers and the minor chambers.

In another embodiment according to any of the previous embodiments, a pressure of the cooling air supplied into the minor chambers is less than a pressure of the cooling air supplied into the major chambers.

In another embodiment according to any of the previous embodiments, the cross-rib is formed by woven plies which are woven together to form a shape, and then densified with an injection of a matrix.

In another featured embodiment, a gas turbine engine includes a compressor section for delivering air into a combustor. A turbine section is positioned downstream of the combustor to receive products of combustion from the combustor. The turbine section includes rows of circumferentially spaced static vanes, axially spaced from rows of rotating turbine blades. The static vanes and the turbine blades both are formed with an airfoil. The airfoils in at least one of the static vanes and the turbine blades have an airfoil body extending between a leading edge and a trailing edge and have a suction wall and a pressure wall. An outer surface of the airfoil body is formed by an outer coat defining the pressure and suction sides, a leading edge and a trailing edge. An internal cross-rib is formed within a cavity in the airfoil body. The internal cross-rib extends to be secured to the outer coat adjacent the leading edge and the trailing edge, and extending across the internal cavity to form a junction such that the cross-rib is x-shaped. The outer coat and the cross-rib are formed of ceramic matrix composites.

In another embodiment according to any of the previous embodiments, the airfoil is part of the static vanes.

In another embodiment according to any of the previous embodiments, major chambers are defined between the junction and the leading edge and the trailing edge. Minor chambers are formed in the cavity between the junction and an inner surface of the pressure side and inner surface of the suction side. There is a cooling air supply supplying cooling air into the major chambers and the minor chambers.

In another embodiment according to any of the previous embodiments, a pressure of the cooling air supplied into the major air chambers is equal to a pressure of the cooling air supplied into the minor chambers.

In another embodiment according to any of the previous embodiments, a pressure of the cooling air supplied into the minor chambers is less than a pressure of the cooling air supplied into the major chambers.

In another embodiment according to any of the previous embodiments, the pressure of the cooling air supplied into the minor chambers is between 10% and 90% of the pressure of the cooling air supplied into the major chambers.

In another embodiment according to any of the previous embodiments, there are at least two of the cross-ribs in the cavity.

In another embodiment according to any of the previous embodiments, the major chambers are defined between the junction on one of the cross-ribs and the leading edge, between the junction on the one of the cross-ribs and the junction on the other of the cross-ribs, and the junctions on the other of the cross-ribs and the trailing edge. The minor chambers are formed in the cavity between the junction and an inner surface of the pressure side and inner surface of the suction side. There is a cooling air supply supplying cooling air into the major chambers and the minor chambers.

In another embodiment according to any of the previous embodiments, a pressure of the cooling air supplied into the minor chambers is less than a pressure of the cooling air supplied into the major chambers.

In another embodiment according to any of the previous embodiments, the cross-rib is formed by woven plies which are woven together to form a shape, and then densified with an injection of a matrix.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
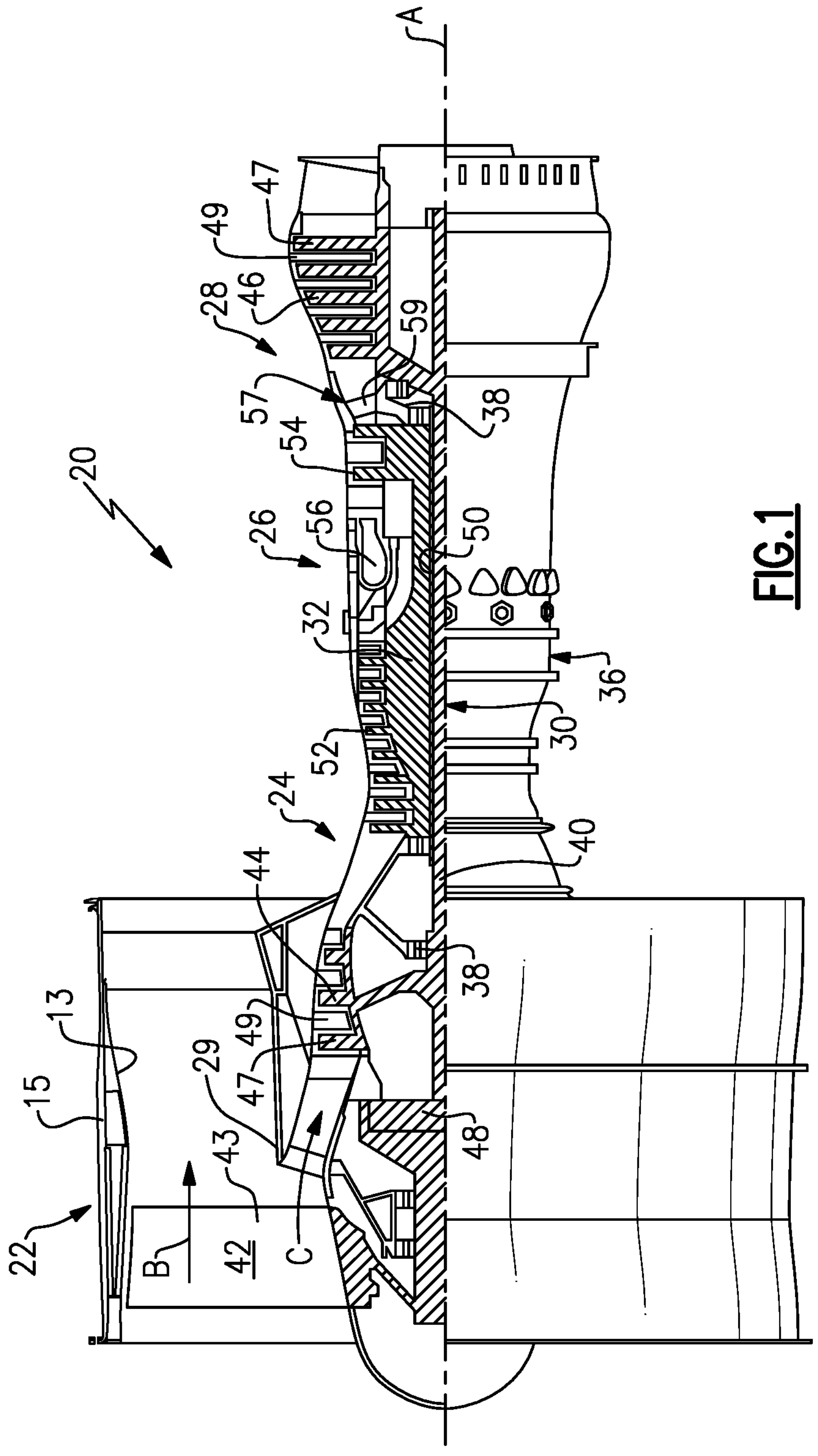
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram } ^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2A:
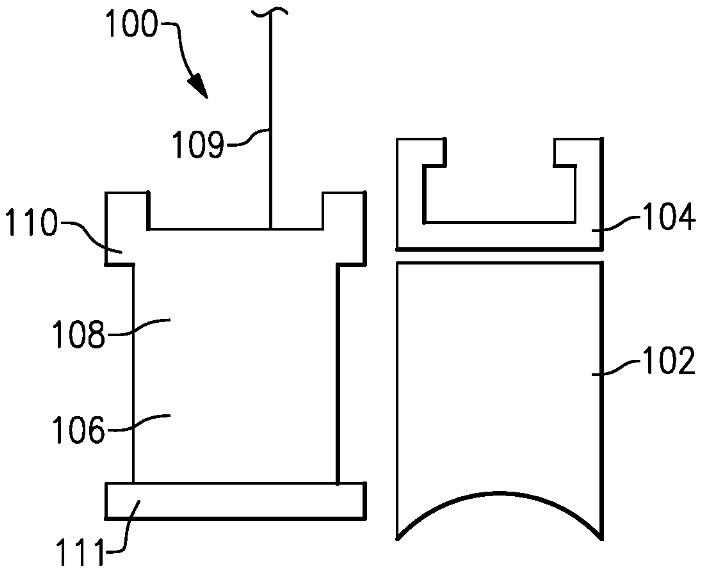
FIG. 2A schematically shows a turbine section.

FIG. 2A shows a turbine section 100 which may be incorporated into an engine such as the engine shown in FIG. 1. As is known, a plurality of circumferentially spaced turbine blades 102 rotate radially inward of a blade outer air seal 104. Axially spaced from the rows of turbine blades 102 are rows of circumferentially spaced static vanes 106. The vanes 106 have an airfoil 108 extending between a radially outer platform 110 and a radially inner platform 111. Vanes are also known that do not have a radially inner platform, and will benefit from the teachings of the disclosure. A cooling air supply 109 supplies cooling air into a cavity within the airfoil 108.

Figure 2B:
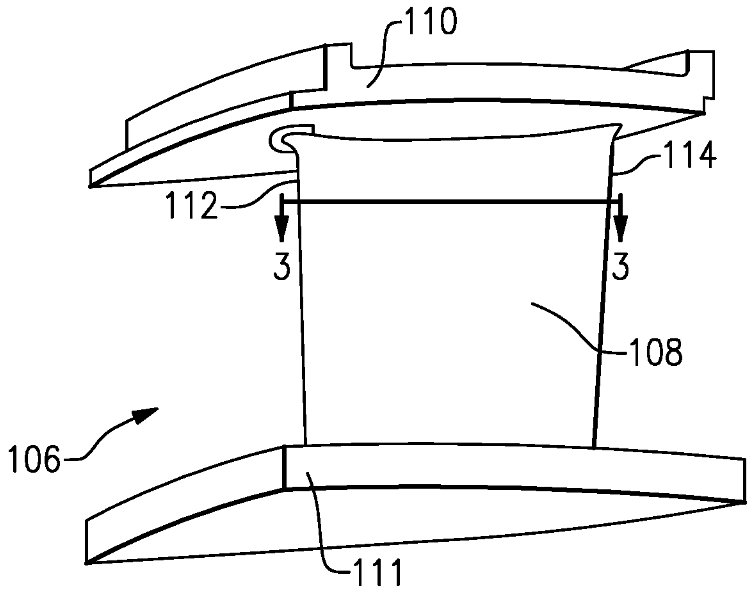
FIG. 2B shows a static vane from the FIG. 2A turbine section.

FIG. 2B is a perspective view of a static vane 106. As can be seen, the airfoil 108 extends from a leading edge 112 to a trailing edge 114.

Figure 3:
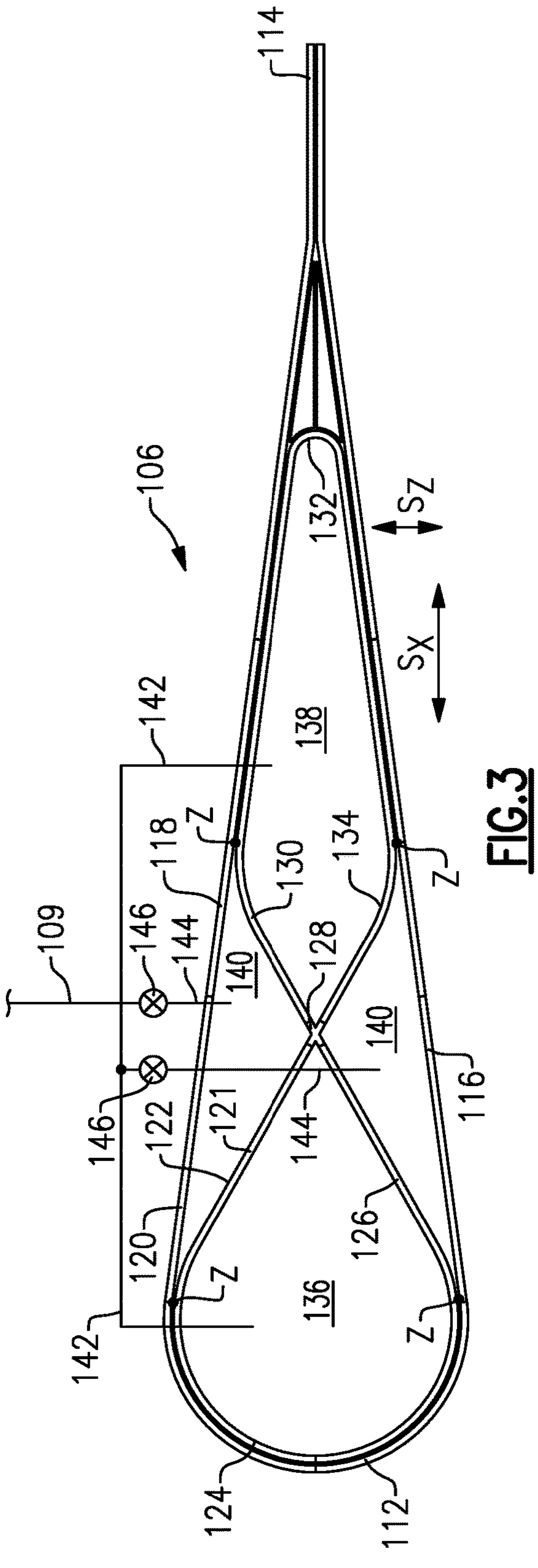
FIG. 3 is a cross-sectional view along line 3-3 of FIG. 2B.

FIG. 3 is a cross-sectional view of a unique static vane 106. The vane 106 has suction and pressure faces 116 and 118 formed with an outer layer 120 which extends around the periphery of sides 116 and 118, the leading edge 112 and the trailing edge 114. In the embodiment shown in FIG. 3, the layer 120 is continuous, but has ends which are secured together to define the trailing edge 114. Of course layer 120 could be formed of plural portions. An internal cross-rib 121 has a portion 122 extending towards the leading edge 112, and a portion 124 that bends around across the leading edge to a return portion 126. The return portion 126 crosses over the portion 122 at a junction 128, and the portion 126 extends into a portion 130 that extends back to a trailing edge portion 132 that merges into an extending portion 134 that connects into the portion 122. That is, the cross-rib 121 may essentially be a single assembly which forms an x-shaped cross rib. Of course, it could be formed by plural portions.

As shown, there are a plurality of joints Z wherein the cross-rib 121 is secured to the outer wrap 120.

Chambers 136 and 138 are defined between the junction 128 and leading edge 112 and trailing edge 114, respectively. For purposes of this disclosure, chambers 136 and 138 are defined as major chambers. Chambers 140 are defined between the crossing portions 122/130 and 126/134, and outwardly of the junction 128. The chambers 140 could be defined as minor chambers.

In embodiments, both the outer wrap 120 and cross rib 121 are formed of ceramic matrix composite tows. A tow is formed of a plurality of fibers that are secured into a matrix material. The wrap 120 and cross-rib 121 may be formed of CMC material or a monolithic ceramic. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcement and is formed of a single material. Example monolithic ceramics include silicon-containing ceramics, such as silicon carbide (SiC) or silicon nitride (Si3N4).

In the past it has been proposed to utilize a single I-beam type cross rib within the interior of the outer wrap 120. However, it has been found that there are real challenges with stress in such an arrangement.

Applicant has discovered that the use of the X-shaped cross-rib allows a designer to reduce those stresses in at least one dimension. A stress $S_x$ direction is defined between the leading edge 112 and the trailing edge 114. Another stress $S_z$ is defined perpendicular to $S_x$, and across a width of the airfoil in the vane 106.

An air supply system 109 supplies cooling air, into the chambers 136, 138 and 140. Connections 142 supply the cooling air into the chambers 136 and 138 and connections 144 supply the cooling air into the minor chambers 140. Optional restrictions or valves 146 are placed on the lines 144.

If the chambers 136, 138 and 140 all receive cooling air at the same approximate pressure, Applicant has discovered that the FIG. 3 embodiment may actually increase the stress level $S_x$ at joints Z compared to the prior I-beam. However, the stress level $S_z$ is sufficiently reduced that the increase in the $S_x$ stress may be justified.

Applicant has also discovered that if the pressure in the minor chambers 140 is reduced through the restrictions or valve 146 compared to the pressure in chambers 136 and 138 then the stress $S_x$ and $S_z$ are both dramatically reduced. In embodiments, the pressure within the minor chambers may be selected to be greater than or equal to 10% of the pressure in the major chambers 136 and 138, and less than or equal to 90%. In further embodiments it is greater than or equal to 10% and less than or equal to 50%.

Figure 4:
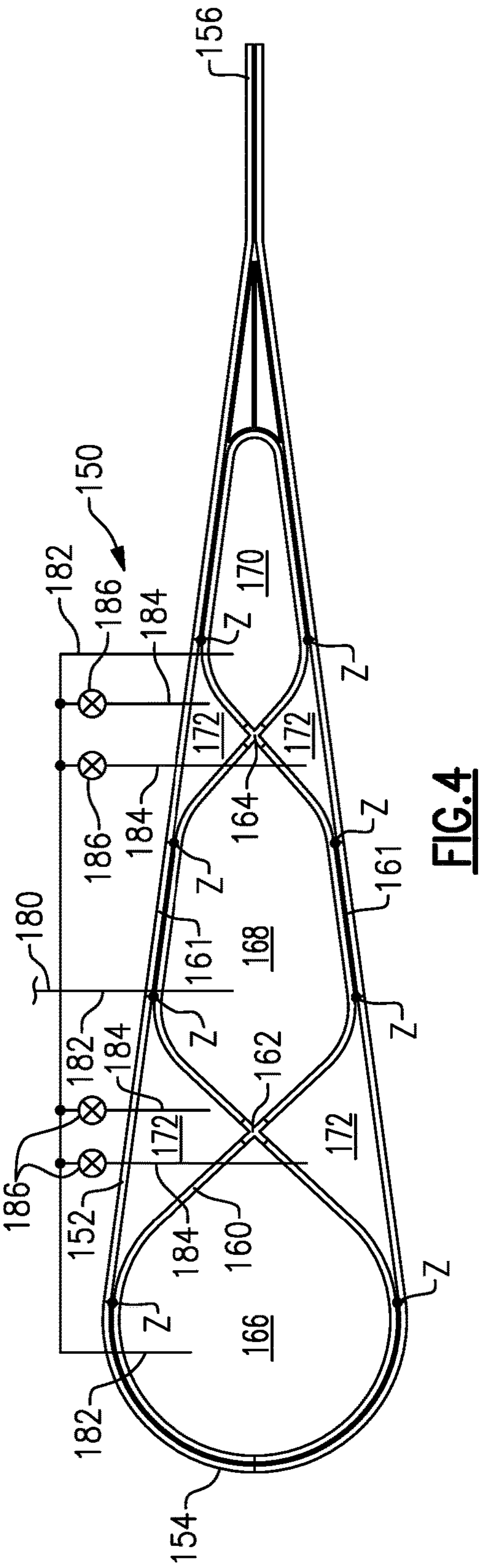
FIG. 4 is an alternative embodiment also taken along line 3-3 of FIG. 2B.

FIG. 4 shows another embodiment 150 wherein there are essentially two X-shaped cross-ribs. In the embodiment vane 150 the outer coat 152 extends along sidewalls, leading edge 154 and the trailing edge 156. The inner wrap 160 bends around to be within the leading edge 154, crosses at a junction 162, extends along the walls 161 of the outer coat 152 to a second junction 164 such that there are essentially two X-shaped cross-ribs.

Major chambers 166, 168 and 170 receive cooling air from the source 180 through conduits 182. The minor chambers 172 receive cooling air from conduits 184 that extend through restrictions or valves 186. Similar to the description of FIG. 3, the pressure within the chambers 166, 168 and 170 may be generally equal to the pressure maintained in the minor chambers 172. On the other hand like in the FIG. 3 embodiment, reduced pressure may be delivered into the chambers 172. The pressures in the two types of chambers may be generally within the range as described with regard to FIG. 3.

With the two X-shaped cross-ribs the $S_x$ stress may be similar to the $S_x$ stress with regard to an I-beam rib when the pressure in all of the chambers is maintained constant. However, the $S_z$ stress decreases even more than with the FIG. 3 embodiment compared to the I-beam rib.

Again, when the pressure in the minor chambers is reduced, both the $S_x$ and $S_z$ stresses are further decreased.

Figure 5A:
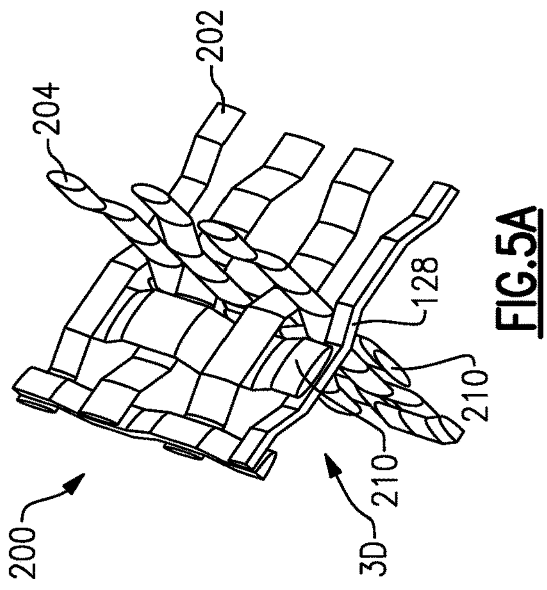
FIG. 5A shows a step in forming internal cross-ribs in the FIG. 3 or 4 embodiments.

FIG. 5A shows a method embodiment for forming the cross-rib structures 122 and 160 of FIGS. 3 and 4. As shown at 200, there may be interweaved tows 202 and 204 are interweaved at the junction 128. Tows 210 are also added to fill in side walls.

Figure 5B:
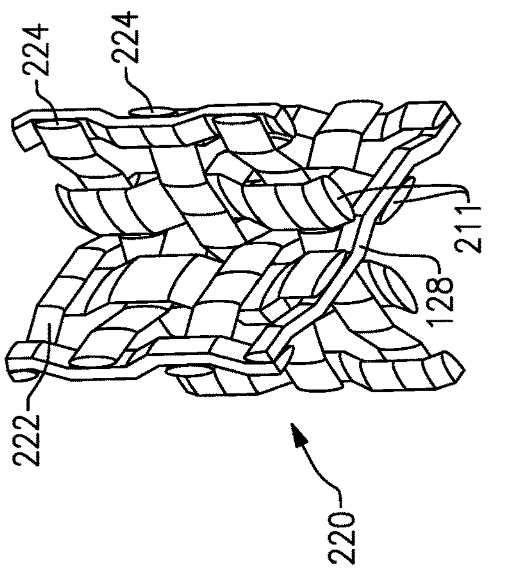
FIG. 5B shows a subsequent step to that of FIG. 5A.

As shown in FIG. 5B, other tows 211 are added to fill in other walls to form intermediate part 220. Part 220 becomes of a shape that extends along the radial dimension of the vanes 106 and 150.

Figure 5C:
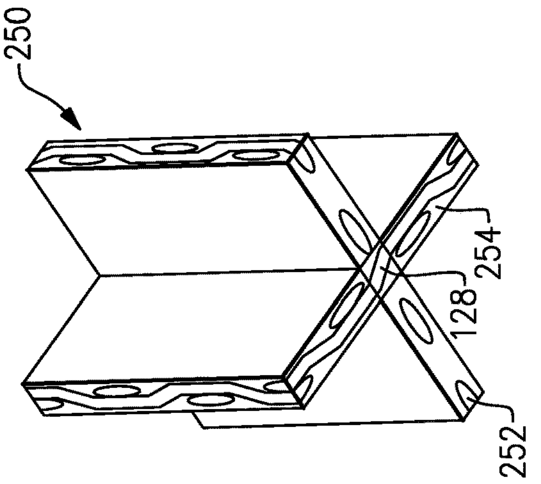
FIG. 5C shows a completed cross-rib.

FIG. 5C shows the final X-shaped cross member 250 having the crossing portions 252 and 254 forming a junction 128. Essentially from FIG. 5B, the entire component 220 is densified by the injection of an appropriate matrix material.

The angle between the members crossing the formed junction may also vary, and can be adjusted to control between inter-lamina and in-plane stresses.

Figure 6:
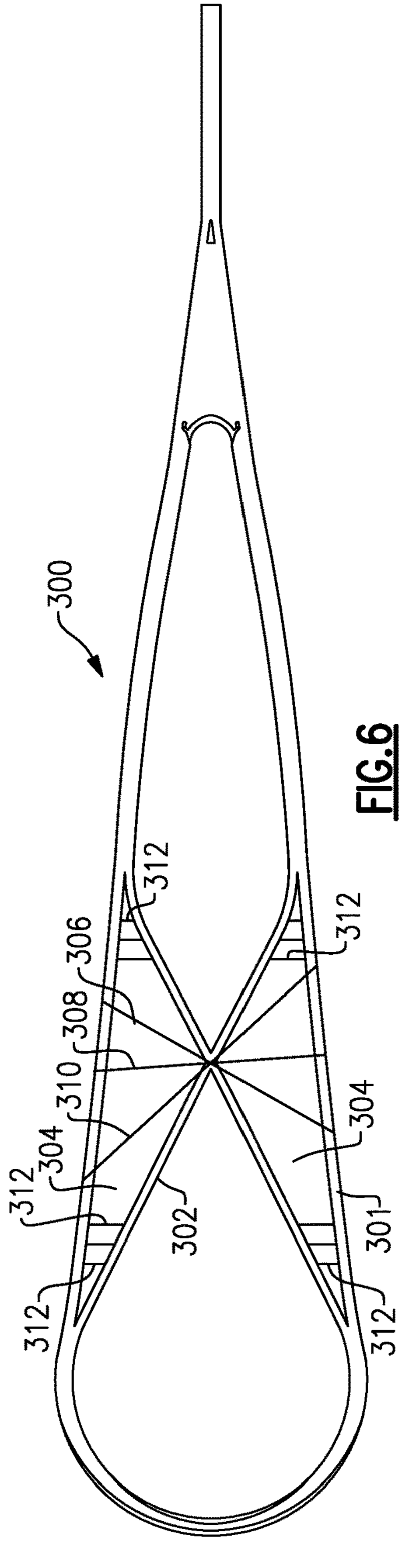
FIG. 6 shows an alternative embodiment airfoil.

FIG. 6 shows an optional embodiment 300 wherein the minor chambers 304 have lattice structure 306, 308, 310 and 312, which may extend between an outer wall of the layer 302 forming the X-shaped cross rib and an inner surface of the outer coat 301. The lattice structure may utilize all of the illustrated locations or, several of the locations, or even just one of the locations as required. The lattice structure provides reinforcement to the walls for the cross-rib. The lattice structure may be constructed using tows extended and weaved in the inter-laminar direction. Alternatively other methods of reinforcement including adding filler material such as noodles can be used.

Figure 7:
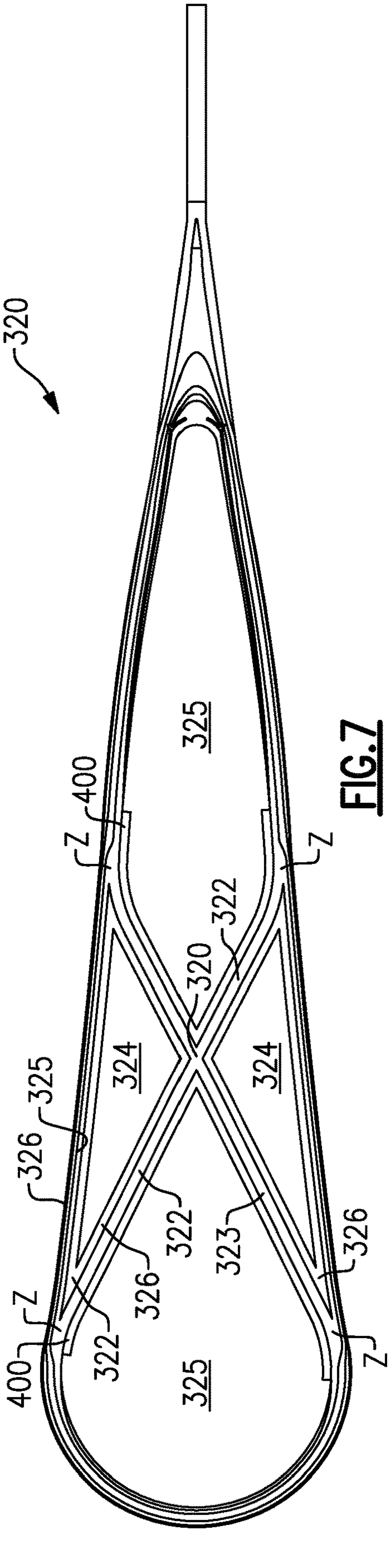
FIG. 7 shows yet another alternative embodiment airfoil.

FIG. 7 shows yet another feature wherein the minor chambers 324 may be locally reinforced such that there are added ply or "pad up" of CMC materials illustrated at 326 to be formed on an outer surface 322 of the cross-rib 323 and an inner surface 325 of the outer cover 326. This can provide additional reinforcement if required. Major chambers 325 may also be provided with added plies 400, at least from the junction 320 beyond joints Z.

While the cross-ribs are specifically disclosed as part of static vanes, they could also be used in other airfoil components such as turbine blades 102.

A gas turbine engine component under this disclosure could be said to include an airfoil body extending between a leading edge and a trailing edge and having a suction wall and a pressure wall. An outer surface of the airfoil body is formed by an outer coat defining around the pressure and suction sides, a leading edge and a trailing edge. An internal cross-rib is formed within a cavity in the airfoil body. The internal cross-rib extends to be secured to the outer coat adjacent the leading edge and the trailing edge, and extending across the internal cavity to form a junction such that the cross-rib is x-shaped. The outer coat and the cross-rib are formed of ceramic matrix composites.

A gas turbine engine under this disclosure could be said to include a compressor section for delivering air into a combustor. A turbine section is positioned downstream of the combustor to receive products of combustion from the combustor. The turbine section includes rows of circumferentially spaced static vanes, axially spaced from rows of rotating turbine blades. The static vanes and the turbine blades both are formed with an airfoil. The airfoils in at least one of the static vanes and the turbine blades having an airfoil body extend between a leading edge and a trailing edge and have a suction wall and a pressure wall. An outer surface of the airfoil body is formed by an outer coat defining the pressure and suction sides, a leading edge and a trailing edge. An internal cross-rib is formed within a cavity in the airfoil body. The internal cross-rib extends to be secured to the outer coat adjacent the leading edge and the trailing edge, and extends across the internal cavity to form a junction such that the cross-rib is x-shaped. The outer coat and the cross-rib are formed of ceramic matrix composites.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine component comprising:

an airfoil body extending between a leading edge and a trailing edge and having a suction wall and a pressure wall, an outer surface of the airfoil body formed by an outer coat defining around the pressure and suction sides, a leading edge and a trailing edge;

an internal cross-rib formed within a cavity in the airfoil body, said internal cross-rib extending to be secured to the outer coat adjacent the leading edge and the trailing edge, and extending across the internal cavity to form a junction such that the cross-rib is x-shaped;

said outer coat and said cross-rib formed of ceramic matrix composites; and the internal cross rib has a portion that bends across the entire leading edge and another portion that extends across the entire trailing edge.

2. The component as set forth in claim 1, wherein said component is a static vane for use in a turbine section of a gas turbine engine.

3. The component as set forth in claim 1, wherein major chambers are defined between said junction and said leading edge and said trailing edge, and minor chambers are formed in the cavity between said junction and an inner surface of said pressure side and inner surface of said suction side, and there is a cooling air supply supplying cooling air into the major chambers and the minor chambers.

4. The component as set forth in claim 3, wherein a pressure of the cooling air supplied into the major air chambers is equal to a pressure of the cooling air supplied into the minor chambers.

5. The component as set forth in claim 3, wherein a pressure of the cooling air supplied into the minor chambers is less than a pressure of the cooling air supplied into the major chambers.

6. The component as set forth in claim 5, wherein the pressure of the cooling air supplied into the minor chambers is between 10% and 90% of the pressure of the cooling air supplied into the major chambers.

7. The component as set forth in claim 3, wherein there are at least two of said cross-ribs in the cavity.

8. The component as set forth in claim 7, wherein the major chambers are defined between said junction on one of the cross-ribs and said leading edge, between said junction on said one of the cross-ribs and the junction on the other of said cross-ribs, and the junction on the other of said cross-ribs and said trailing edge, and the minor chambers are formed in the cavity between each said junction and an inner surface of said pressure side and inner surface of said suction side, and there is a cooling air supply supplying cooling air into the major chambers and the minor chambers.

9. The component as set forth in claim 8, wherein a pressure of the cooling air supplied into the minor chambers is less than a pressure of the cooling air supplied into the major chambers.

10. The component as set forth in claim 1, wherein said cross-rib is formed by woven plies which are woven together to form a shape, and then densified with an injection of a matrix.

11. A gas turbine engine comprising:

a compressor section for delivering air into a combustor, a turbine section positioned downstream of the combustor to receive products of combustion from the combustor;

the turbine section comprising rows of circumferentially spaced static vanes, axially spaced from rows of rotating turbine blades, said static vanes and said turbine blades both being formed with an airfoil;

the airfoils in at least one of said static vanes and said turbine blades having an airfoil body extending between a leading edge and a trailing edge and having a suction wall and a pressure wall, an outer surface of the airfoil body formed by an outer coat defining the pressure and suction sides, a leading edge and a trailing edge;

an internal cross-rib formed within a cavity in the airfoil body, said internal cross-rib extending to be secured to the outer coat adjacent the leading edge and the trailing edge, and extending across the internal cavity to form a junction such that the cross-rib is x-shaped; and said outer coat and said cross-rib formed of ceramic matrix composites; and the internal cross rib has a portion that bends across the entire leading edge and another portion that extends across the entire trailing edge.

12. The gas turbine engine as set forth in claim 11, wherein said airfoil is part of said static vanes.

13. The gas turbine engine as set forth in claim 11, wherein major chambers are defined between said junction and said leading edge and said trailing edge, and minor chambers are formed in the cavity between said junction and an inner surface of said pressure side and inner surface of said suction side, and there is a cooling air supply supplying cooling air into the major chambers and the minor chambers.

14. The gas turbine engine as set forth in claim 13, wherein a pressure of the cooling air supplied into the major air chambers is equal to a pressure of the cooling air supplied into the minor chambers.

15. The gas turbine engine as set forth in claim 13, wherein a pressure of the cooling air supplied into the minor chambers is less than a pressure of the cooling air supplied into the major chambers.

16. The gas turbine engine as set forth in claim 15, wherein the pressure of the cooling air supplied into the minor chambers is between 10% and 90% of the pressure of the cooling air supplied into the major chambers.

17. The gas turbine engine as set forth in claim 13, wherein there are at least two of said cross-ribs in the cavity.

18. The gas turbine engine as set forth in claim 17, wherein the major chambers are defined between said junction on one of the cross-ribs and said leading edge, between said junction on said one of the cross-ribs and the junction on the other of said cross-ribs, and the junctions on the other of said cross-ribs and said trailing edge, and the minor chambers are formed in the cavity between said junction and an inner surface of said pressure side and inner surface of said suction side, and there is a cooling air supply supplying cooling air into the major chambers and the minor chambers.

19. The gas turbine engine as set forth in claim 18, wherein a pressure of the cooling air supplied into the minor chambers is less than a pressure of the cooling air supplied into the major chambers.

20. The gas turbine engine as set forth in claim 11, wherein said cross-rib is formed by woven plies which are woven together to form a shape, and then densified with an injection of a matrix.

* * * * *